(12) United States Patent
Schlerf et al.

(10) Patent No.: US 8,096,109 B2
(45) Date of Patent: Jan. 17, 2012

(54) SYSTEM OF A FUEL CELL AND AN INTERNAL-COMBUSTION ENGINE

(75) Inventors: Guenter Schlerf, Graefelfing (DE); Joachim Tachtler, Ismaning (DE); Juergen Kammerer, Pfaffenhofen (DE); Dirk Christian Leinhos, Troy, MI (US); Karsten Kuehn, Munich (DE)

(73) Assignee: Bayerische Motoren Werke Aktiengesellschaft, Munich (DE)

( * ) Notice: Subject to any disclaimer, the term of this patent is extended or adjusted under 35 U.S.C. 154(b) by 775 days.

(21) Appl. No.: 11/766,574

(22) Filed: Jun. 21, 2007

(65) Prior Publication Data
US 2007/0243440 A1 Oct. 18, 2007

Related U.S. Application Data

(63) Continuation of application No. PCT/EP2005/013690, filed on Dec. 20, 2005.

(30) Foreign Application Priority Data

Dec. 23, 2004 (DE) .......................... 10 2004 062 152

(51) Int. Cl.
*F01N 3/00* (2006.01)

(52) U.S. Cl. ................ 60/286; 60/282; 60/303; 60/320; 429/419; 429/434

(58) Field of Classification Search ............. 60/274, 60/282, 303, 286, 295, 320; 429/17, 19, 429/20, 26, 416, 419, 433, 434, 436
See application file for complete search history.

(56) References Cited

U.S. PATENT DOCUMENTS

| 6,276,473 | B1 | 8/2001 | Zur Megede |
| 6,502,533 | B1 | 1/2003 | Meacham |
| 6,588,211 | B2 * | 7/2003 | Friebe et al. ..................... 60/716 |
| 6,874,314 | B2 | 4/2005 | Tachtler et al. |
| 6,918,365 | B2 * | 7/2005 | Wetzel et al. .......... 123/142.5 R |
| 6,994,930 | B1 * | 2/2006 | Geisbrecht et al. ............. 429/19 |
| 7,146,801 | B2 * | 12/2006 | Kamijo et al. .................. 60/286 |
| 7,235,217 | B2 * | 6/2007 | Nguyen ........................ 422/198 |
| 7,700,070 | B2 * | 4/2010 | Finkbeiner et al. ........... 423/650 |
| 2002/0092294 | A1 * | 7/2002 | Kempfer ......................... 60/284 |
| 2004/0055798 | A1 * | 3/2004 | Almkermann .............. 180/65.2 |
| 2004/0058211 | A1 | 3/2004 | Tachtler et al. |
| 2004/0177607 | A1 * | 9/2004 | Suzuki et al. ................... 60/286 |

FOREIGN PATENT DOCUMENTS

DE 199 13 794 A1 10/2000
(Continued)

*Primary Examiner* — Tu Nguyen
(74) *Attorney, Agent, or Firm* — Crowell & Moring LLP

(57) ABSTRACT

A system including a fuel cell and an internal-combustion engine, particularly for a motor vehicle. Preferably, exhaust gas from the internal-combustion engine flows at least essentially around the fuel cell. Exhaust gas from the internal-combustion engine may also flow around an afterburner for the fuel cell exhaust gas and/or around a reformer for processing fuel. The fuel cell and/or afterburner and/or reformer may be arranged downstream of a purification system for the internal-combustion engine exhaust gases and may be essentially inside a pipe or the like carrying the latter. The fuel cell and the reformer may also be arranged upstream of an exhaust gas purification system. Part of the fuel cell exhaust gas flow may be fed to the internal-combustion engine for combustion, and exhaust gases from the fuel cell and/or the internal-combustion engine may transfer heat with the air for the fuel cell.

12 Claims, 3 Drawing Sheets

FOREIGN PATENT DOCUMENTS

| | | |
|---|---|---|
| DE | 199 13 795 C1 | 10/2000 |
| DE | 100 54 007 A1 | 6/2002 |
| DE | 100 62 965 A1 | 6/2002 |
| DE | 101 13 000 A1 | 9/2002 |
| DE | 101 21 665 A1 | 1/2003 |
| WO | WO 95/27845 A1 | 10/1995 |

* cited by examiner

SYSTEM OF A FUEL CELL AND AN INTERNAL-COMBUSTION ENGINE

CROSS-REFERENCE TO RELATED APPLICATIONS

This application is a continuation of International Patent Application No. PCT/EP2005/013690 filed Dec. 20, 2005 which claims benefit to German patent application Serial No. 10 2004 062 152.7 filed Dec. 23, 2004, the entire disclosures of which are hereby incorporated by reference in their entirety.

FIELD OF THE INVENTION

The invention relates to a system consisting of a fuel cell and of an internal-combustion engine having an exhaust gas system, particularly for a motor vehicle, a thermal energy flow of the internal-combustion engine being thermally coupled with a thermal energy flow of the fuel cell.

BACKGROUND AND SUMMARY OF THE INVENTION

With respect to the associated technical field, in addition to German Patent Documents DE 101 13 000 A1 (U.S. Pat. No. 6,918,365) and DE 199 13 795 C1 as well as German Patent Application 2004 048 526, which is no prior publication, reference is made particularly to German Patent Document DE 100 54 007 A1 (U.S. Pat. No. 6,588,211).

Particularly for the use in motor vehicles, it could be an interesting concept for the future to combine an internal-combustion engine operating as a vehicle drive assembly and a fuel cell generating electric energy either only in the form of an APU (=auxiliary power unit) or even for an electromotive drive, which would then be designed as a so-called hybrid drive. Various suggestions already exist as to how the fuel cell and the internal-combustion engine can be thermally coupled with one another in such a manner that the waste heat of one of these two units can be utilized by the other unit.

German Patent Document DE 101 13 000 A1 suggests a thermal coupling between the housing of the internal-combustion engine, that is, the so-called engine block, and the fuel cell in order to utilize the waste heat and in the process particularly the residual heat of the fuel cell during a vehicle stoppage for the temperature equalization of the internal-combustion engine. According to German Patent Document DE 199 13 795 C1, the fuel cell and internal-combustion engine units have a number of components in common, such as the radiator, the exhaust gas system and the air filters. In this case, the fuel cell system can be heated by the exhaust gases of the internal-combustion engine, specifically by means of one or more suitable heat exchanger(s) through which air or fuel for the fuel cell is carried. According to German Patent Document 100 54 007 A1, energy flows and/or substance flows of a driving internal-combustion engine of a motor vehicle are coupled with those of the fuel cell system.

Hereby, it is to be demonstrated how such a basically known thermal coupling between a fuel cell and an internal-combustion engine can be still further increased and can therefore be improved, which is one object of the present invention.

This object is achieved for a system consisting of a fuel cell and of an internal-combustion engine in an arrangement where the exhaust gas of the internal-combustion engine flows around the fuel cell. Advantageous embodiments and further developments are described herein.

A heat-transferring connection between the exhaust gas flow of an internal-combustion engine and a fuel cell, or the air flow or fuel flow supplied to the latter is basically known. However, in the present invention a direct heat transfer is provided between the exhaust gas of the internal-combustion engine and the fuel cell, specifically in that the exhaust gas of the internal-combustion engine flows around the fuel cell or a corresponding housing of the latter, in which housing, among other things, the gas flows reacting with one another by way of the electrodes of the fuel cell are guided by way of these electrodes. For a fast heating of the fuel cell, for example, a solid oxide fuel cell (SOFC), whose operating temperature, as known, is in the order of from 600° C. to 800° C., the relatively hot exhaust gas flow of the internal-combustion engine is extremely helpful, if the operation of the latter is started before or simultaneously with that of the fuel cell. Naturally, the fuel cell can also be appropriately equalized in its temperature for its entire operating duration as a result of the exhaust gas flow of the internal-combustion engine.

The heat transfer between the internal-combustion engine exhaust gas and the fuel cell in this quasi direct manner takes place much more rapidly and efficiently than indirect methods using heat exchangers, although the last-mentioned heat-transferring connection by way of heat exchangers (specifically by way of a fluid flow fed to the fuel cell) may be provided in an additional and supporting fashion. Thus, in addition to the direct heat transfer between the exhaust gas of the internal-combustion engine and the fuel cell first suggested here, a heat-transferring connection may be provided by way of a heat exchanger (or the like), such that exhaust gases of the internal-combustion engine are in a heat-transferring connection with the air flow or fuel flow fed to the fuel cell. The same applies to the exhaust gases of the fuel cell; that is, the heat contained in the latter can also be partially returned to the fuel cell by way of a heat exchange with another fluid flow.

Advantageously, the basic suggestion of the present invention, specifically the suggestion of at least essentially letting the exhaust gas of the internal-combustion engine flow around the fuel cell or its housing, leads to a reduced insulation requirement at the fuel cell or at its periphery (housing, supply lines, etc.), since, on the one hand, the loss of heat of the fuel cell is reduced because of the slight temperature difference between the fuel cell and the exhaust gas flow surrounding the latter and, on the other hand, an exhaust gas system carrying the exhaust gas flow of the internal-combustion engine in the case of the (preferred) use in a motor vehicle normally is already sufficiently insulated toward the latter. Thus, advantageously, virtually no additional insulation measures for the protection of the vehicle or its components will be required in view of the temperatures of the fuel cell system.

For implementing the suggestion of letting the exhaust gas flow of an internal-combustion engine flow at least essentially around a fuel cell, the fuel cell or its housing may be at least essentially integrated in the exhaust gas system carrying the exhaust gases of the internal-combustion engine; that is, it may, for example, be arranged inside a correspondingly designed pipe having a correspondingly enlarged cross-section, or in a wall section of a hollow body operating as an exhaust-gas-carrying pipe. At least for those embodiments of the invention in which the fuel cell or its housing is arranged upstream of an exhaust gas treatment system or an exhaust gas purification system in the exhaust gas system of the internal-combustion engine, the fuel cell or its waste heat can be utilized for bringing this exhaust gas treatment system, which may, for example, by a 3-way catalyst or a particle filter or a DeNOx catalyst, faster to its operating temperature, or for burning this exhaust gas treatment system (particularly in the form of a particle filter or a DeNOx catalyst) free. This is particularly so when the exhaust gas of the fuel cell had previously been afterburnt or further heated in a so-called afterburner. (The latter is basically known to a person skilled in the art). A corresponding operating method is therefore characterized in that, preferably after a further treatment in an afterburner, the exhaust gas of the fuel cell is fed in a targeted manner to an exhaust gas purification system for its regenerating, which exhaust gas purification system, as a matter of priority, is assigned to the internal-combustion engine.

In addition to flowing around the fuel cell, the exhaust gas flow of the internal-combustion engine can also at least essentially flow around an afterburner for the exhaust gas of the fuel cell and/or around a reformer for processing its fuel, or these above-mentioned units may correspondingly at least essentially be arranged inside the exhaust gas system of the internal-combustion engine. As a result, also these elements can be heated or insulated in a simple manner, or it becomes easily possible to connect the fuel cell with these elements, or their waste heat can easily and efficiently be utilized for the internal-combustion engine or its exhaust gas purification system. This is so at least if the fuel cell or the fuel cell and a reformer is/are arranged upstream of an exhaust gas purification system for the internal-combustion engine exhaust gases at least essentially inside a pipe or the like carrying them. Advantageously, the exhaust gases of the fuel cell can thereby be treated in the exhaust gas purification system, so that an independent afterburner is no longer required for this purpose. As an alternative, the fuel cell or the fuel cell and/or an afterburner and/or a reformer (for processing the fuel) may be arranged downstream of an exhaust gas purification system for the internal-combustion engine exhaust gases at least essentially inside a pipe carrying the latter.

According to an advantageous further development, at least a portion of the exhaust gas flow of the fuel cell can be fed to the internal-combustion engine for the combustion or can generally be fed to an exhaust gas recirculation device of the internal-combustion engine. In this manner, unburnt residual fuel, which could be contained in the fuel cell exhaust gas, can be meaningfully utilized, specifically burnt in the internal-combustion engine while releasing mechanical energy. Additionally, the exhaust gas emissions of the internal-combustion engine may be simultaneously reduced. Furthermore, the temperature level of the internal combustion engine or of the exhaust gas recirculation device can thereby be kept within a desired range. However, at least a portion of the exhaust gas of the internal-combustion engine can also be supplied directly to the reformer or to a reformer for the processing of fuel for the fuel cell, in this case, the constituents of this exhaust gas can be utilized in the reformer.

Incidentally, the thermal energy of the exhaust gas of the fuel cell and/or of the internal-combustion engine may not only—as indicated above—be used in a heat exchanger for heating the fresh-air flow supplied to the fuel cell but—also in a suitable heat exchanger—for preheating fuel, particularly in the event that fuel intended for the internal-combustion engine is fed to a reformer for the processing of fuel for the fuel cell, in which case, this fuel is pre-evaporated upstream of the reformer in a heat exchanger.

BRIEF DESCRIPTION OF THE DRAWINGS

The three attached schematic diagrams (FIG. 1, FIG. 2, FIG. 3) illustrate systems according to the invention consisting of a fuel cell and an internal-combustion engine. In the figures, the exhaust gas of the internal-combustion engine always flows around the fuel cell, and particularly different courses of fluid flows are shown which are "coupled to one another". In all figures, the same elements have identical reference numbers.

DETAILED DESCRIPTION OF THE DRAWINGS

Figure 1:
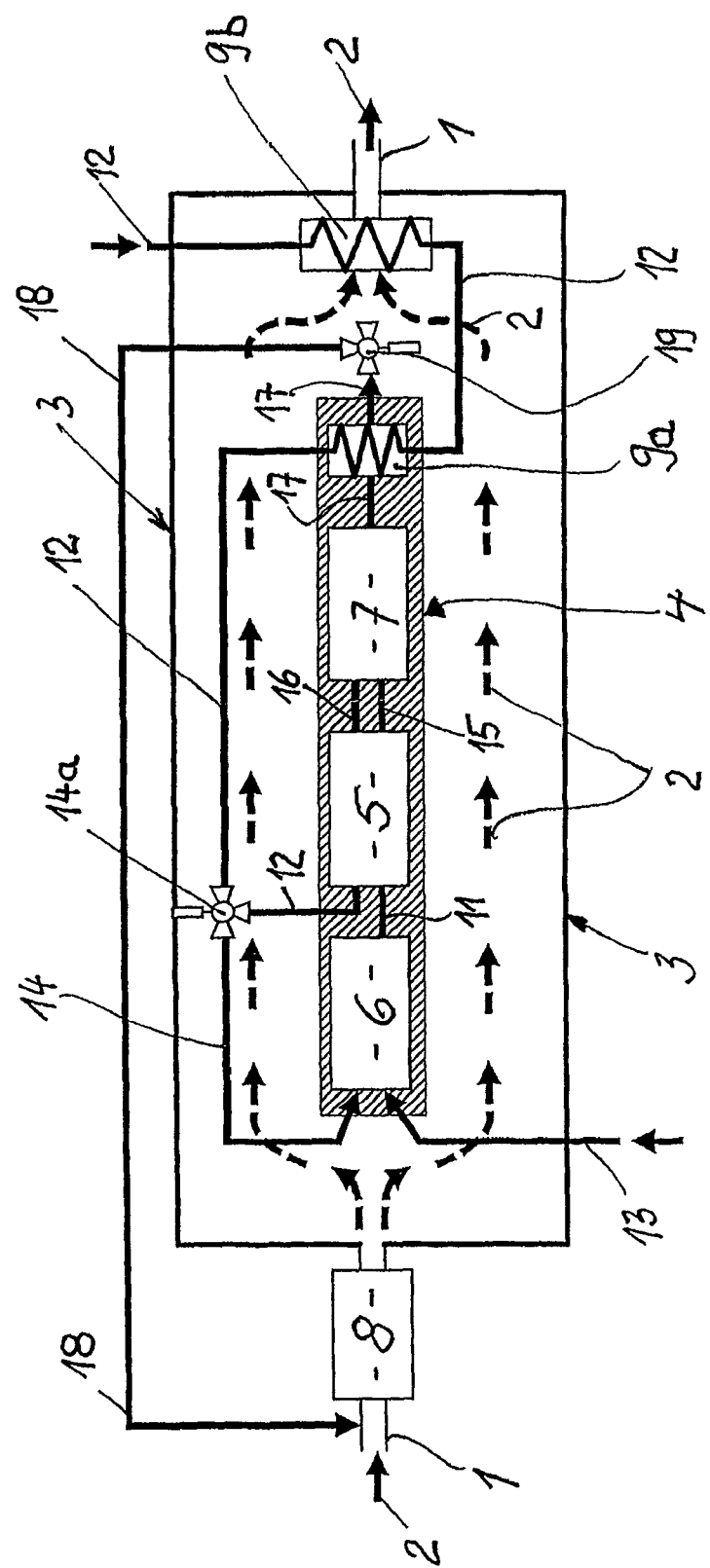

Thus, the reference number 1 indicates a section of an exhaust gas system of an internal-combustion engine, which internal-combustion engine is not shown, (particularly operating as a drive assembly of a motor vehicle), through which the exhaust gas flow of the internal-combustion engine illustrated in the figures by the arrows 2 is guided from the left to the right. This exhaust gas system 1 has an expanded system in the shape of a pipe 3 or the like, inside which not only the exhaust gases of the internal-combustion machine are carried but inside which a housing 4 is also arranged which itself contains at least one fuel cell 5. The exhaust gas flow 2 flows directly around this housing 4 or acts upon this housing 4 on the exterior side, so that a portion of the heat quantity contained in the exhaust gas flow 2 is delivered to the housing 4 or to its wall.

At least one fuel cell 5 is arranged inside the housing 4, to which a suitable fuel is supplied by way of a pipe 11 and air (or atmospheric oxygen) is supplied by way of a pipe 12 from the outside, that is, from outside the exhaust gas system 1 and through the wall of the housing 4, so that electric current is generated in the fuel cell in a known manner. By way of an electric line that is not shown, this electric current is conducted to the outside to be used there. The fuel cell 5, whose concrete construction is not important for the essence of the present invention—which, in particular, is a solid-oxide fuel cell—is connected with the housing 4 in such a heat-transferring connection that this fuel cell 5 is, in turn, heated by the housing 4 which is heated by the exhaust gas flow.

In all illustrated embodiments, a reformer 6 for processing fuel for the fuel cell 5, specifically from the fuel provided for the internal-combustion engine which is not shown, is arranged beside the fuel cell 5 or in front of the fuel cell 5 in the housing 4. The fuel is therefore delivered to the reformer 6 from the outside by way of a pipe 13, while the fuel generated in the reformer for the fuel cell 5 is supplied to the latter from the reformer 6 by way of the above-mentioned pipe 11. For the above-mentioned fuel processing, air or atmospheric oxygen also has to be supplied to the reformer 6, which takes place by way of a pipe 14.

Figure 2:
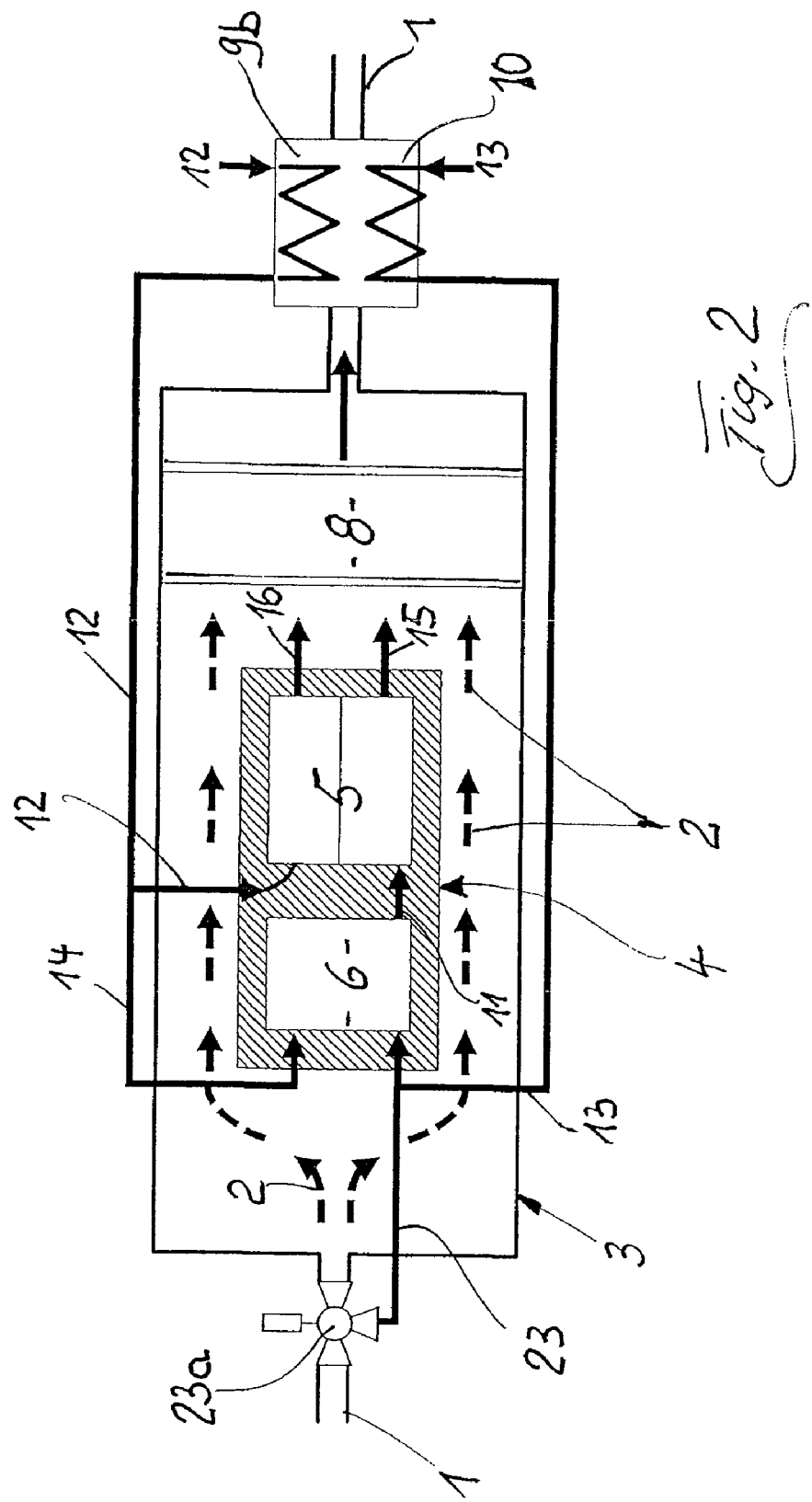

In the embodiments according to FIGS. 1 and 2, a so-called afterburner 7 is also provided inside the housing 4, in which afterburner 7 exhaust gas of the fuel 5, which may contain still unburnt fuel constituents, will be or can be afterburnt. The corresponding exhaust gas flow of the fuel cell 5 is removed from the latter by way of a pipe 15. In addition, the outgoing-air flow of the fuel cell 5, which normally still contains unconsumed atmospheric oxygen, is removed by way of a pipe 16. The pipes 15 and 16 lead into the afterburner 7, so that a successful afterburning or combustion of the residual fuel of the fuel cell 5 can take place in this afterburner 7. The exhaust gases of this afterburner 7 will then be removed from the latter as well as from the housing 4 by way of a pipe 17.

Another component of the exhaust gas system 1 is an exhaust gas catalyst 8 for purifying the exhaust gas 2 of the internal-combustion engine. Alternatively, instead of this exhaust gas catalyst 8, another exhaust gas purification system (for which the reference number 8 is also used) may be provided. In the embodiment according to FIG. 2, this exhaust gas purification system 8 is arranged inside the housing 4, while, in the other two embodiments, it is provided upstream of the latter. The details will be explained below.

In the individual pipes or sections of pipes which supply air or fuel to the above-described elements, heat exchangers 9a, 9b (for air) and 10 (for fuel) respectively are also provided, one of the respective exhaust gas flows of this system also flowing through these heat exchangers or being admitted to them, so that a portion of the thermal energy contained in the respective exhaust gas flow is delivered to the fresh-air flow supplied, among other things, to the fuel cell 5 by way of the pipe 12 and to the fuel flow supplied to the reformer 6 by way of the pipe 13 respectively.

With reference to the embodiment according to FIG. 1, the exhaust gas catalyst 8 is arranged upstream of the housing 4. Here, the fuel is supplied to the reformer 6 by way of a pipe 13 without any special preheating. However, the air flow, which is supplied to the fuel cell 5 by way of the pipe 12, and is supplied to the reformer 6 by way of the pipe 14 branching off therefrom by way of a valve 14a, is heated particularly intensively. Specifically, an independent heat exchanger 9b is provided here for this air flow, which is acted upon only by the exhaust gas of the afterburner 7 and which here is still arranged inside the housing 4 (upstream of the afterburner 7). With respect to the air flow carried in the pipe 12, a heat exchanger 9a is disposed in front of this heat exchanger 9b, through which heat exchanger 9a, the exhaust gas flow 2 of the internal-combustion engine is further guided after passing through the housing 4, this heat exchanger 9a being arranged inside the pipe 3, and the pipe 12 (and 14 respectively) guiding the fresh-air flow from the heat exchanger 9a through the heat exchanger 9b to the fuel cell 5 and the reformer 6 respectively extending within this pipe 3. In this embodiment, the exhaust gas flow of the afterburner 7 can be introduced into the exhaust gas system 1 upstream of the exhaust gas catalyst 8 by way of a pipe 18 which is connected to a change-over valve 19 having the pipe 17 as the input, so that an exhaust gas purification can again be carried out in this exhaust gas catalyst 8, or this exhaust gas catalyst 8 can be heated. As an alternative, by way of the change-over valve 19, the pipe 17 can lead into the pipe 3, so that the exhaust gas flow of the afterburner 7, together with the exhaust gas flow 2 of the internal-combustion engine, is removed through the heat exchanger 9a by way of the section of the exhaust as system 1 connected to the pipe 3.

Figure 3:
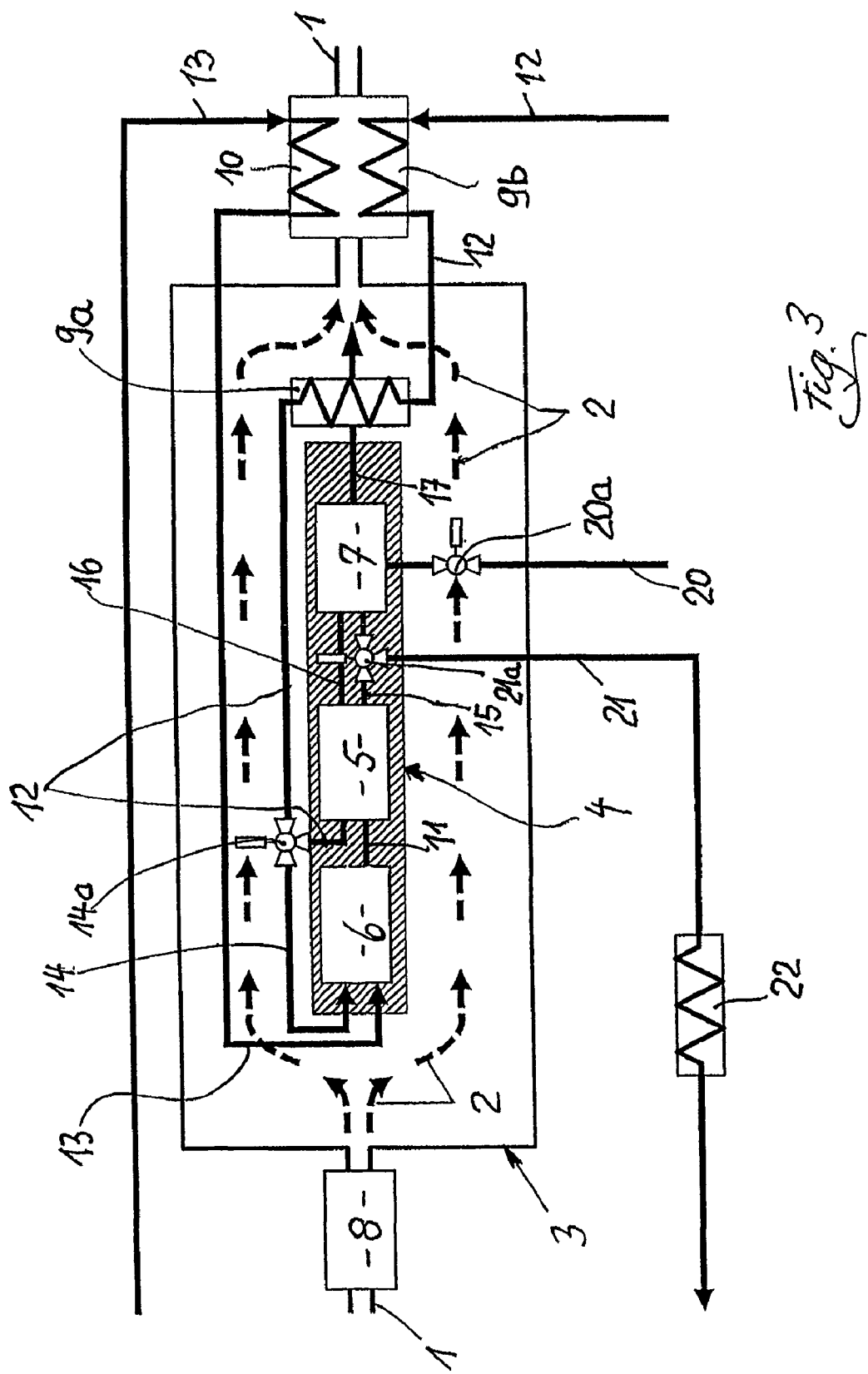

Similar to the embodiment according to FIG. 1, the embodiment explained in the following is constructed according to FIG. 3 but, in this case, the exhaust gas flow of the afterburner 7 cannot be returned into the exhaust gas catalyst 8, but only through the heat exchanger 9b, which here is arranged outside the housing 4 but inside the pipe 3, can be admixed to the exhaust gases 2 of the internal-combustion engine and be removed, together with these, through the heat exchangers 9a, 19, which are integrated outside the pipe 3 in the exhaust gas system.

While the heat exchanger 9a is (again) used for preheating air conducted in the pipe 12, in the heat exchanger 10, the fuel is heated which is supplied to the reformer 6 by way of the pipe 13. This embodiment further contains a pipe 20, by way of which—controlled by means of a pilot valve 20a—additional fresh air (or atmospheric oxygen as the oxidant)—can be supplied to the afterburner 7. Furthermore, by way of a pipe 21 connected to a change-over valve 21a provided in pipe 15, a partial quantity of between 0% and 100% of the exhaust gas flow of the fuel cell can be removed, specifically by way of a cooler 22 to the (not shown) internal-combustion engine, in which this fuel cell exhaust can then be afterburnt; advantageously while utilizing the unburnt residual fuel still contained therein.

In the embodiment according to FIG. 2, viewed in the flow direction of the internal-combustion engine exhaust gas 2, the exhaust gas catalyst 8 or the exhaust gas purification system 8 is arranged downstream of the fuel cell 5 or downstream of the housing 4 but, in this case, still inside the pipe 3 that also the exhaust gas of the fuel cell 5 removed by way of the pipe 15 as well as its outgoing air removed by way of the pipe 16 is guided through the exhaust gas purification system 8, so that the latter simultaneously operates virtually as an afterburner for the fuel cell exhaust gas. After flowing through the exhaust gas purification system 8, the entire exhaust gas flow, analogous to the embodiment according to FIG. 3, is removed through a heat exchanger 9b for the air carried in the pipe 12 as well as through a heat exchanger 10 for the fuel carried through the pipe 13 and subsequently further in the exhaust gas system 1. In this embodiment, in addition to the fuel intended for the internal-combustion engine—which fuel is fed by way of the pipe 13—exhaust gas of the internal-combustion engine can also be supplied to the reformer 6, specifically by way of a pipe 23 which by way of a valve 23a, branches off the exhaust gas system 1 upstream of the pipe 3. This exhaust gas could also contain unburnt fuel constituents and other possibly useful constituents.

The embodiments have in common the fuel cell 5 but also further pertaining elements, specifically and, as required, a reformer 6, and an afterburner 7, which are physically thermally integrated in the exhaust gas system 1 of an internal-combustion engine. With the start of the operation of the internal-combustion engine, the fuel cell 5 can therefore be brought to its operating temperature as fast as possible, and high-expenditure insulating measures will not be necessary. By means of the preferably (except in FIG. 2) two-stage preheating of the air, the waste heat of the exhaust gases of the fuel cell 5 (and/or as required, of the afterburner 7) as well as of the internal-combustion engine can be further utilized. However, in the embodiments according to FIGS. 1 and 2, with the start of the operation of the fuel cell 5, the exhaust gas catalyst 8 can also be preheated when the internal-combustion engine is not operated. In this case, a large number of embodiments may have different configurations than in the above explanation but still be within the inventive concepts described and claimed herein.

The foregoing disclosure has been set forth merely to illustrate the invention and is not intended to be limiting. Since modifications of the disclosed embodiments incorporating the spirit and substance of the invention may occur to persons skilled in the art, the invention should be construed to include everything within the scope of the appended claims and equivalents thereof.

The invention claimed is:

1. A system comprising a fuel cell and an internal-combustion engine having an exhaust gas system wherein said system is configured such that a thermal energy flow of the internal-combustion engine is thermally coupled with a thermal energy flow of the fuel cell, wherein exhaust gas flow from the internal-combustion engine flows essentially around the fuel cell, the system configured such that the exhaust gas flow of the internal-combustion engine, in addition to flowing essentially around the fuel cell, flows essentially around at least one of an exhaust gas afterburner for processing exhaust gas and a reformer for processing fuel, wherein the fuel cell and at least one of the afterburner and the reformer is disposed in a housing that is arranged inside a pipe carrying the internal combustion engine exhaust gases, and wherein the system is configured such that the exhaust gas flow flows directly around the housing or acts upon an exterior side of the housing.

2. A system according to claim 1, configured such that at least one of the fuel cell, the afterburner for processing exhaust gas and the reformer for processing fuel are arranged downstream of an exhaust gas purification system for internal-combustion engine exhaust gases.

3. A system according to claim 1, configured such that the fuel cell or the fuel cell and the reformer for processing fuel are arranged upstream of an exhaust gas purification system for internal-combustion engine exhaust gases and the reformer is arranged inside the pipe carrying the internal-combustion engine exhaust gases.

4. A system according to claim 1, configured such that exhaust gases of the fuel cell or of the internal-combustion engine are in a heat-transferring connection with an air flow fed to the fuel cell.

5. A system according to claim 1, configured such that at least a portion of an exhaust gas flow from the fuel cell may be fed to the internal-combustion engine for combustion.

6. A system according to claim 1, configured such that at least part of the fuel intended for the supply of the internal-combustion engine is fed to a heat exchanger associated with the reformer for processing fuel and the exhaust gas from at least one of the fuel cell and the internal-combustion engine flows through the heat exchanger.

7. A system according to claim 1, configured such that exhaust gas of the internal-combustion engine is fed to the reformer for processing fuel.

8. A system according to claim 1, configured such that the exhaust gas flow of the internal-combustion engine, in addition to flowing essentially around the fuel cell, flows essentially around the exhaust gas afterburner for processing exhaust gas and around the reformer for processing fuel.

9. A system according to claim 1, configured such that exhaust gases of the fuel cell and of the internal-combustion engine are in a heat-transferring connection with an air flow fed to the fuel cell.

10. A system according to claim 1, wherein
a portion of thermal energy contained in the exhaust gas flow is delivered to the housing or to a wall of the housing.

11. An operating method for a system according to claim 1 comprising feeding exhaust gas from the fuel cell in a targeted manner to an exhaust gas purification system to regenerate the exhaust gas purification system.

12. The method of claim 11, further comprising treating the exhaust gas of the fuel cell in the afterburner before feeding the exhaust gas from the fuel cell to an exhaust gas purification system.

* * * * *